(12) United States Patent
Fischer et al.

(10) Patent No.: US 10,875,502 B2
(45) Date of Patent: Dec. 29, 2020

(54) MONITORING AND MODIFYING MOTOR VEHICLE FUNCTIONS IN A MOTOR VEHICLE

(71) Applicant: Bayerische Motoren Werke Aktiengesellschaft, Munich (DE)

(72) Inventors: Kay Fischer, Reichertshausen (DE); Albrecht Neff, Unterschleissheim (DE); Michael Pitz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 293 days.

(21) Appl. No.: 16/012,996

(22) Filed: Jun. 20, 2018

(65) Prior Publication Data

US 2018/0297610 A1    Oct. 18, 2018

Related U.S. Application Data

(63) Continuation of application No. PCT/EP2016/081714, filed on Dec. 19, 2016.

(30) Foreign Application Priority Data

Dec. 21, 2015  (DE) .......................... 10 2015 226 236

(51) Int. Cl.
*B60R 25/30* (2013.01)
*B60R 25/00* (2013.01)
(Continued)

(52) U.S. Cl.
CPC ........ *B60R 25/307* (2013.01); *B60R 16/0238* (2013.01); *B60R 25/00* (2013.01);
(Continued)

(58) Field of Classification Search
CPC .................................................. B60R 25/307
See application file for complete search history.

(56) References Cited

U.S. PATENT DOCUMENTS 9,117,318 B2 *  8/2015  Ricci ..................... G06F 3/0482
9,218,698 B2 * 12/2015  Ricci ..................... A61B 5/7405
(Continued)

FOREIGN PATENT DOCUMENTS

CN          1472611 A     2/2004
CN        203623598 U     6/2014
(Continued)

OTHER PUBLICATIONS

International Search Report (PCT/ISA/210) issued in PCT Application No. PCT/EP2016/081714 dated Feb. 23, 2017 with English translation (six (6) pages).

(Continued)

*Primary Examiner* — Alex C Dunn
(74) *Attorney, Agent, or Firm* — Crowell & Moring LLP

(57) ABSTRACT

A method for monitoring and modifying motor vehicle functions, includes the following steps: ascertaining an anomalous behavior of a function; transmitting the anomalous behavior to a back end; receiving instructions from the back end, the instructions indicating acute measures to be taken in the motor vehicle in order to adequately react to the anomalous behavior of the function; ascertaining a motor vehicle component which is the cause of the anomalous behavior on the basis of the received instructions; converting the motor vehicle component to a degraded configuration which has a limited functional scope; and if the conversion to the degraded configuration is not possible, converting the motor vehicle component to a safe configuration.

20 Claims, 10 Drawing Sheets

(51) Int. Cl.
    *B60R 16/023*      (2006.01)
    *B60W 50/02*      (2012.01)
    *B60W 50/029*      (2012.01)
    *G07C 5/00*      (2006.01)
    *G07C 5/08*      (2006.01)

(52) U.S. Cl.
    CPC ........ *B60W 50/02* (2013.01); *B60W 50/0205* (2013.01); *B60W 50/029* (2013.01); *B60W 50/0225* (2013.01); *G07C 5/008* (2013.01); *G07C 5/0808* (2013.01)

(56) References Cited

U.S. PATENT DOCUMENTS

| | | | |
|---|---|---|---|
| 2003/0093187 A1* | 5/2003 | Walker | B64D 45/0059 |
| | | | 701/1 |
| 2004/0004454 A1 | 1/2004 | Shimizu et al. | |
| 2011/0258044 A1* | 10/2011 | Kargupta | G06Q 30/0251 |
| | | | 705/14.49 |
| 2012/0277949 A1* | 11/2012 | Ghimire | G07C 5/008 |
| | | | 701/31.4 |
| 2013/0179006 A1 | 7/2013 | Nordbruch et al. | |
| 2014/0249714 A1* | 9/2014 | Gormley | G07C 5/008 |
| | | | 701/36 |
| 2014/0310277 A1* | 10/2014 | Ricci | G01C 21/26 |
| | | | 707/736 |
| 2015/0088351 A1* | 3/2015 | Meeks | B60K 1/00 |
| | | | 701/22 |
| 2015/0336587 A1 | 11/2015 | Inoue et al. | |
| 2015/0344039 A1 | 12/2015 | Amoh et al. | |
| 2016/0232721 A1* | 8/2016 | Singh | G07C 5/008 |
| 2016/0349330 A1* | 12/2016 | Barfield, Jr. | G07C 5/008 |
| 2016/0364920 A1* | 12/2016 | Nelson | G07C 5/006 |
| 2016/0371977 A1* | 12/2016 | Wingate | G08G 1/096844 |
| 2017/0011561 A1* | 1/2017 | Makke | G07C 5/085 |
| 2017/0146995 A1* | 5/2017 | Stamatovski | G07C 5/008 |
| 2017/0161965 A1* | 6/2017 | Du | G06F 11/36 |

FOREIGN PATENT DOCUMENTS

| | | |
|---|---|---|
| CN | 105050859 A | 11/2015 |
| DE | 10 2012 200 184 A1 | 7/2013 |
| EP | 0 503 409 A2 | 9/1992 |
| EP | 1 227 007 A2 | 7/2002 |
| GB | 2473956 A | 3/2011 |
| JP | 2014-51108 A | 3/2014 |
| WO | WO 2013/028840 A1 | 2/2013 |
| WO | WO 2014/195180 A1 | 12/2014 |

OTHER PUBLICATIONS

German-language Written Opinion (PCT/ISA/237) issued in PCT Application No. PCT/EP2016/081714 dated Feb. 23, 2017 (five (5) pages).

Chinese-language Office Action issued in Chinese Application No. 201680073725.0 dated Feb. 21, 2020 with English translation (20 pages).

\* cited by examiner

US 10,875,502 B2

MONITORING AND MODIFYING MOTOR VEHICLE FUNCTIONS IN A MOTOR VEHICLE

CROSS REFERENCE TO RELATED APPLICATIONS

This application is a continuation of PCT International Application No. PCT/EP2016/081714, filed Dec. 19, 2016, which claims priority under 35 U.S.C. § 119 from German Patent Application No. 10 2015 226 236.7, filed Dec. 21, 2015, the entire disclosures of which are herein expressly incorporated by reference.

BACKGROUND AND SUMMARY OF THE INVENTION

The present invention relates to a method for monitoring and modifying motor vehicle functions in a motor vehicle, to a device in this respect, and to a motor vehicle in this respect.

If malfunctions are currently ascertained in control units, then these faults are rectified either by a software update in the workshop or, if this is not possible, by an exchange of the control unit in the workshop. In both cases, however, the vehicle has to be taken to a workshop.

Furthermore, it is currently possible to adapt control units and/or vehicle functions to new and/or altered conditions only by means of a software update to be carried out in the workshop.

Moreover, the situation in which vehicle functions and/or vehicle functionalities and control units are compromised has increased in prevalence recently. Such security gaps that occur can currently also only be rectified by a laborious software update in a workshop.

It would therefore be desirable to provide a possibility which rectifies such malfunctions and disturbances and/or such critical events rapidly and without the need to visit a workshop.

It is an aim of the invention to propose a possibility which avoids or at least reduces at least some of the disadvantages known in the prior art.

The object is achieved according to the invention by means of a method, a device, and a corresponding motor vehicle in accordance with embodiments of the invention.

In this case, the invention relates to a method for monitoring and modifying motor vehicle functions in a motor vehicle. The method comprises: determining an anomalous behavior of a function of the motor vehicle; communicating the anomalous behavior of the function of the motor vehicle to a backend; receiving an instruction from the backend; wherein the instruction is indicative of an acute measure to be taken in the motor vehicle in order to carry out an adequate reaction to the anomalous behavior of the function; determining a motor vehicle component which is the cause of the anomalous behavior of the function of the motor vehicle, on the basis of the received instruction; converting the motor vehicle component into a degraded configuration as adequate reaction, wherein the degraded configuration has a more limited functional scope than in the previous configuration thereof. And if converting the motor vehicle component into the degraded configuration is not possible, the method furthermore comprises: converting the motor vehicle component into a safe configuration as adequate reaction. In this case, the safe configuration is kept available in the motor vehicle component.

In this case, the method steps can be carried out in an automated manner.

An anomalous behavior within the meaning of the invention here means a behavior of a motor vehicle function which lies outside a defined behavior. In this case, the anomalous behavior can be a critical event which is security- and/or safety-relevant with respect to a corresponding driving situation and/or a vehicle function and/or a control unit of the motor vehicle.

A function within the meaning of the invention here means a process which is carried out by a motor vehicle component and affects the behavior of the motor vehicle. Examples thereof may be assistance functions, such as steering movements, high beam assistance function, distance keeping and the like of the motor vehicle, but also convenience functions such as, for example, navigation, electrical automatic seat adjustment and the like.

A backend within the meaning of the invention here means a server or a cloud that provides determined solutions for known and unknown problems in the case of motor vehicle functions and/or control units of motor vehicles. This can be realized for example by means of a corresponding problem-solution database.

A motor vehicle component within the meaning of the invention here means devices such as, for example, control units or control devices, convenience function devices and assistance systems, which can be configured both in hardware and in software. Determining the motor vehicle component can be carried out in this case for example on the basis of control unit information. This is information which can be used to deduce a specific control unit, such as, for example, a serial number, a date of manufacture, a firmware number and the like or else a combination of these items of information.

A degraded configuration within the meaning of the invention here means a configuration which limits the function and/or the functional scope of the corresponding motor vehicle component by means of parameter modification. A parameter modification here can mean in particular a change of a value of a corresponding parameter of a vehicle function and/or of a control unit of the motor vehicle. In this case, preferably a default value of the corresponding parameter can be temporarily overwritten. That is to say that the default value is not lost, but rather is temporarily stored, preferably in the control unit itself. However, it is also possible to temporarily store the default value at a different location in the motor vehicle, for example in a central controller in a central default value database. In this case, the modified parameter can be reset again for example after a specific time limit, that is to say can thus be overwritten once again with the default value. The overwritten value may be lost in the case. However, it may also additionally continue to be kept available in storage.

A safe configuration within the meaning of the invention here means a configuration which is stored in the motor vehicle component and is deemed to be functionally safe in respect of valid safety standards, such as, for example, ISO26262 and standards based thereon.

The teaching according to the invention affords the advantage that in the case where a functional disturbance of the motor vehicle or of parts of the motor vehicle occurs, this behavior can be identified and, with the aid of a backend system, it is possible to seek a corresponding solution for the functional disturbance that has occurred and/or vehicle functions and/or control units affected by the functional disturbance and it is then possible to provide a corresponding solution for the functional disturbance that has occurred.

A further advantage is that an adequate reaction to a functional disturbance that has occurred can thus be promptly carried out in order to curb the functional disturbance and still to enable safe operation of the motor vehicle and/or to be able to prevent problematic, that is say unsafe, vehicle operation from being able to arise.

In this case, the invention also relates to a device for monitoring and modifying motor vehicle functions in a motor vehicle. In this case, the device comprises: a functional monitoring device for determining an anomalous behavior of a function of the motor vehicle; a determining unit, for determining a motor vehicle component which is the cause of the anomalous behavior of the function of the motor vehicle. A modifying unit, for converting the motor vehicle component into a degraded configuration and/or into a safe configuration, wherein the degraded configuration has a more limited functional scope than in the previous configuration thereof. In this case, the safe configuration is kept available in the motor vehicle component. In this case, the safe configuration of the motor vehicle component is safeguarded against manipulation of the safe configuration. And in this case the device is configured to carry out any method according to the invention.

The teaching according to the invention affords the advantage that in the case where a functional disturbance of the motor vehicle or of parts of the motor vehicle occurs, a device for the motor vehicle can identify this behavior and, with the aid of a backend system, independently can seek a corresponding solution for the functional disturbance that has occurred and/or vehicle functions and/or control units affected by the functional disturbance and can subsequently provide a corresponding solution for the functional disturbance that has occurred.

A further advantage is that an adequate reaction to a functional disturbance that has occurred can thus be promptly carried out in order to curb the functional disturbance and still to enable safe operation of the motor vehicle and/or to be able to prevent problematic, that is say unsafe, vehicle operation from being able to arise.

In this case, the invention still further relates to a motor vehicle. The motor vehicle comprises: at least one motor vehicle component, a mobile radio communication device, for communicating an anomalous behavior of a function of the motor vehicle to a backend and for receiving an instruction in respect of the anomalous behavior of the function, and a device according to the invention for monitoring and modifying motor vehicle functions in the motor vehicle. In this case, the motor vehicle component has a safe configuration, which is preferably safeguarded against manipulation of the safe configuration. And the device according to the invention for monitoring and modifying motor vehicle functions in the motor vehicle is configured to carry out any method according to the invention.

The teaching according to the invention affords the advantage that in the case where a functional disturbance of the motor vehicle or of parts of the motor vehicle occurs, the motor vehicle can identify this behavior and, with the aid of a backend system, independently can seek a corresponding solution for the functional disturbance that has occurred and/or vehicle functions and/or control units affected by the functional disturbance and can subsequently provide a corresponding solution for the functional disturbance that has occurred.

A further advantage is that an adequate reaction to a functional disturbance that has occurred can thus be promptly carried out in order to curb the functional disturbance and still to enable safe operation of the motor vehicle and/or to be able to prevent problematic, that is say unsafe, vehicle operation from being able to arise.

The invention further relates to a computer program product for a device according to the invention and/or a motor vehicle according to the invention, wherein the device is operable according to any method according to the invention.

The teaching according to the invention affords the advantage that the method can be carried out particularly efficiently in an automated manner.

The invention also relates to a data carrier comprising a computer program product according to the invention.

The teaching according to the invention affords the advantage that the method can be distributed and/or kept available particularly efficiently among devices, systems and/or motor vehicles that carry out the method.

Before configurations of the invention are described more thoroughly below, firstly it should be emphasized that the invention is not restricted to the components described or the method steps described. Furthermore, the terminology used does not constitute any restriction either, but rather is merely exemplary in character. Insofar as the singular is used in the description and the claims, the plural is concomitantly encompassed here in each case, provided that the context does not explicitly rule this out. Possible method steps can be carried out in an automated manner, provided that the context does not explicitly rule this out.

Further exemplary configurations of the method according to the invention are explained below.

In accordance with a first exemplary configuration, the method furthermore comprises, for the case where converting the motor vehicle component into the safe configuration is not possible, switching off the motor vehicle component as adequate reaction.

This configuration has the advantage that emergency operation can be made possible in which the motor vehicle can be operated safely, even if the motor vehicle component affected by the functional disturbance cannot be converted into a safe configuration.

In accordance with a further exemplary configuration, the method furthermore comprises, for the case where switching off the motor vehicle component is not successful, converting the motor vehicle into a safe state as adequate reaction. In this case, the safe state comprises safe operation of the motor vehicle in respect of a safety and/or security relevance.

Safe operation within the meaning of the invention here means operation which is functionally safe in respect of safety and/or security aspects of driving operation and/or vehicle operation of the motor vehicle.

Safety-relevant within the meaning of the invention here means relevant in respect of valid safety standards such as, for example, ISO26262 and standards based thereon.

By contrast, security-relevant within the meaning of the invention here means relevant to access protection, protection against intruders, protection against data corruptions and/or data manipulations, manipulations of control units and the like.

A safe state in respect of the critical event within the meaning of the invention can mean here a state of a corresponding driving situation and/or of a vehicle function and/or of a control unit of the motor vehicle, in which in respect of the safety-relevant function/system/module to be controlled and thus of possible further safety-relevant functions/systems/modules connected thereto, from which no untenable risk to live and limb can proceed.

This configuration has the advantage of being able to make it possible to react to safety- and/or security-relevant critical functional disturbances of the motor vehicle and to ensure that the motor vehicle remains functionally safe in operation.

In accordance with a further exemplary configuration, the method furthermore comprises, for the case where converting the motor vehicle into the safe state is not possible, switching off driving operation of the motor vehicle as adequate reaction.

This configuration has the advantage that it is possible to prevent a motor vehicle in which there is a functional disturbance of motor vehicle components which cannot be rectified, this motor vehicle from being operated unsafely.

In accordance with a further exemplary configuration, the method furthermore comprises the fact that switching off driving operation of the motor vehicle is carried out safely in respect of a safety relevance of the motor vehicle.

This configuration has the advantage that switching off the motor vehicle can be carried out without an accident.

In accordance with a further exemplary configuration, the method furthermore comprises communicating the adequate reaction carried out to the backend, as successfully taken acute measure in the motor vehicle.

This configuration has the advantage that quality assurance for the instruction communicated to the motor vehicle becomes possible.

A further advantage is that the adequate reaction carried out can be recorded in the backend in order, on the basis thereof, to be able to determine further solution possibilities or to be able to further develop the communicated instructions in order to continuously improve the latter.

In accordance with a further exemplary configuration, the method furthermore comprises receiving a patch from the backend, as an anomaly correction instruction which is indicative of a persistent measure to be taken in the motor vehicle in order to eliminate and/or to prevent the anomalous behavior of the function in the future.

This configuration has the advantage that over and above a temporary solution, for the functional disturbance or for the anomalous behavior of the affected function it is possible to provide a permanent modification in order a renewed occurrence of said anomalous behavior or in order, upon a renewed occurrence of said anomalous behavior, to be able to enable functionally safe operation of the function of the motor vehicle.

In accordance with a further exemplary configuration, the method furthermore comprises: determining a further motor vehicle component which is likewise affected by the anomalous behavior of the function of the motor vehicle, preferably on the basis of the received instruction, and correspondingly applying the further method steps for modifying the motor vehicle component to the further motor vehicle component.

Correspondingly applying the further method steps for modifying the motor vehicle component to the further motor vehicle component within the meaning of the invention here means that method parts of the exemplary configurations described, for rectifying and/or correcting the anomalous behavior of the motor vehicle component, are also applicable to the further motor vehicle component.

This configuration has the advantage that a solution to the anomalous behavior of further affected functions can be provided.

In accordance with a further exemplary configuration, the method furthermore comprises communicating the adequate reaction carried out to a further motor vehicle, as instruction, for a current and/or preventive acute measure to be taken in the further motor vehicle.

This configuration has the advantage that further motor vehicles can be prepared and/or preconditioned for the anomalous behavior, even if said motor vehicles have not yet been affected by the anomalous behavior at this point in time.

In accordance with a further exemplary configuration, the method furthermore comprises the fact that communicating the adequate reaction carried out to the further motor vehicle is carried out from the motor vehicle.

This configuration has the advantage that the motor vehicle affected by the anomalous behavior can itself correspondingly prepare further motor vehicles.

In accordance with a further exemplary configuration, the method furthermore comprises the fact that communicating the adequate reaction carried out to the further motor vehicle is carried out from the backend.

This configuration has the advantage that, once the backend has been informed of the motor vehicle affected by the anomalous behavior, the backend can correspondingly instruct further motor vehicles in a preparatory manner.

In accordance with a further exemplary configuration, the method furthermore comprises the fact that determining the anomalous behavior of the function of the motor vehicle is ascertainable by the backend, from a motor vehicle occupant, and/or from a motor vehicle-specific routine.

This configuration has the advantage that the occurrence of the anomalous behavior can be ascertained by a plurality of sources. The speed of discovery of the anomalous behavior can be increased as a result. The time from the first occurrence of the anomaly to the discovery thereof can be reduced as a result, whereby the motor vehicle safety and/or motor vehicle reliability can be increased.

In accordance with a further exemplary configuration, the method furthermore comprises the fact that the backend comprises a certified motor vehicle-external authority.

This configuration has the advantage that the possibility of misuse of the invention presented, for example for a use for infiltrating such an anomalous behavior, can be at least reduced if not even totally prevented.

In accordance with a further exemplary configuration, the method comprises the fact that the instruction comprises an indication of the criteria under which the adequate reaction can be canceled again.

Such criteria can be time-dependent, but can also be specific states, such as function states or motor vehicle states, for example, which, upon such a criterion being present, provide for cancellation of the modifications to be made.

This configuration has the advantage of providing a possibility of cancelling again or reversing the modification to be made. This may be the case in particular if it is clear that the anomalous behavior is only of temporary nature.

In accordance with a further exemplary configuration, the method furthermore comprises the fact that the anomalous behavior of the function of the motor vehicle is indicative of hacking of the motor vehicle or of the motor vehicle component.

In this case, the hacking can be carried out by means of data manipulation or else a manipulation of a control unit, for example by means of a so-called hacking attack, from outside the motor vehicle by means of a wireless solution.

This configuration has the advantage that compromising of a motor vehicle or of a motor vehicle function of the motor vehicle can be combated as rapidly as possible in order to be able to curb the compromising.

In accordance with a further exemplary configuration, the method furthermore comprises the fact that the anomalous behavior of the function is suitable for jeopardizing functionally safe operation of the motor vehicle.

This configuration has the advantage that for vehicle-critical functions corresponding modification and intervention possibilities can be provided and/or carried out.

In accordance with a further exemplary configuration, the method furthermore comprises the fact that the safe configuration of the motor vehicle component is safeguarded against manipulation of the safe configuration.

This configuration has the advantage that a fallback option protected particularly against hacking can be provided for a motor vehicle function.

The invention thus allows an anomalous behavior of the motor vehicle to be combated and precautions to be provided and to be able to be carried out in order to be able to block such an anomalous behavior for the purpose of the motor vehicle being able to continue to provide functionally safe operation of the motor vehicle in such a case. This makes it possible for specific function parameterizations tailored to the vehicle, that is to say including the corresponding installed parts, the driver and the concrete driving situation, to be generated in the backend and loaded into the vehicle, which parameterizations can furthermore take account of additional knowledge from the backend.

For the functions, default parameterizations are stored in the vehicle, said default parameterizations enabling, if appropriate, only a limited functionality. In an extreme case this can mean that a function is deactivated until a corresponding parameter data set is available as a solution to a problem.

And if, in the case of corresponding relevant vehicle properties, a critical event is identified which can be regarded as an anomalous behavior, seeking and providing a corresponding parameter data set, which can have for example corresponding function parameterizations or function limitations and/or no complete function activation release of the corresponding control unit and/or of the corresponding function as parameter information.

Consequently, partial scopes, that is to say with fine granularity, of functions and/or control units can be deactivated and/or modified via the backend as soon as said partial scopes have an anomalous behavior.

In particular, faults and/or malfunctions of the motor vehicle that occur can be rectified.

In the case of hacking of the motor vehicle, it is possible to intervene particularly effectively in order to be able to effectively counteract the effects of the hacking and also the hack itself.

Analogously to a differentiated "bulkhead system" in shipbuilding against ingress of water, the following measure is thus proposed in automobiles in respect of a dynamic compartmentalization of sensitive vehicle scopes upon the occurrence of acute safety- and security-relevant problems.

This can be achieved by means of a safety controller unit in the vehicle, for the coordinated implementation of safety mechanisms, if a safety or security problem is identified in the backend or in the vehicle by means of monitoring algorithms.

There follow some examples of such safety mechanisms:
A) adaptation of gateway table—by means of routing rules from which bus to which bus and/or from which control unit to which control unit—for specific or all applicative messages, signals and diagnosis messages, for example blocking of specific message types or IDs, receivers, transmitters, buses.
B) change of switch and router configurations, for example Ethernet/IP such as, for example, non-translation of specific message types
C) adaptation of the messages maximally translated per unit time from one bus to the other bus or from one control unit, also called CU, to another CU, so-called denial-of-service defense
D) blocking of messages of specific senders or addresses in the switch or gateway
E) complete deactivation of specific control units and/or sensors/actuators, by means of, for example, deenergization, transfer to the bootloader, blocking of all outgoing messages, deactivation of LIN bus, deactivation of LIN sensors/actuators
F) deactivation of specific functions or permanent degradation
G) physical deactivation of specific bus terminals The abovementioned mechanisms can be implemented in central or decentralized gateways of the vehicle.

The abovementioned mechanisms can also be safeguarded individually and/or in predefined combinations and be certified in respect of their efficacy and, if appropriate, in respect of safety/security.

Furthermore, a predefined filing of specific combinations can be provided in the vehicle.

Moreover, a "maximum safety" configuration for the mechanisms mentioned here can be stored in the motor vehicle, such as, for example, a gateway table, energization and the like, which lead to a maximally safe vehicle and present a minimal target/residual risk. Furthermore, acute formation of quarantine mechanisms for subsystems such as control units or buses, for example, can be carried out.

Such configurations can be triggered by the trigger mechanisms mentioned here by way of example.

The abovementioned mechanisms, if activated, may optionally then be effective only in specific vehicle or function states, for example only during travel, but not at standstill; only during internet access, but not during offline operation of the vehicle and the like.

The abovementioned combinations of mechanisms are then selected according to specific vehicle or function states.

The abovementioned methods can be realized for example in a central gateway between central switches.

The abovementioned mechanisms and/or methods can be triggered by a command or else by configuration stipulation from the backend, in the vehicle or by the vehicle user himself/herself, for example by means of a human-machine interface, also called a HMI, or USB stick. An HMI input could require a correspondingly long and thus secure, specific "secret code" communicated from the service provider, such as the vehicle manufacturer, for example to the customer for example in person, by letter, over the telephone or else by USB download.

However, the abovementioned mechanisms can also be triggered automatically if an unblock command that prevents the automatic triggering by the safety controller unit is not effected recurrently within a time interval. In this case, the unblock command can be effected via the backend or via smartphone/USB stick/vehicle key of the customer/QR code/barcode/numeric input/mobile radio/SMS, if a data connection to the backend cannot be effected.

Example: if within 7 days in each case the monitoring system in the vehicle does not receive from the backend/smartphone/USB stick/data memory on the vehicle key/QR code/barcode—for example in a readable manner via a smartphone with vehicle link or via cameras of the vehicle/mobile radio/SMS/numeric input a message that the system can be used without reservations, the abovementioned mechanisms are correspondingly triggered in order to assume a safe state. In this case, the backend can generate corresponding unblock codes, if appropriate vehicle-specifically depending on equipment, HW-SW versions, the current country, customer behavior and the like.

Furthermore, it is additionally possible to provide a mechanism in which the vehicle provides vehicle data for determining whether the vehicle is affected by a security/safety topic and for determining an unblock key. If an online connection cannot be established, this can also be effected via the smartphone of the vehicle user, a USB stick/vehicle key of the vehicle user/QR code/barcode/display of a code in the smartphone and/or in the head unit and the like. Said code must then be input in the back end from a vehicle-external computer.

The abovementioned mechanisms can be triggered, if appropriate, via a two-factor authentication; by way of example, triggering or deactivation of the automatic triggering can be carried out only if the triggering or the unblock code was received via two independent technical routes.

In this case, feedback concerning the fact that the triggering has been carried out can be given to the vehicle user. Moreover, a confirmation can be given by the vehicle user. Furthermore, a notification can also be given regarding the fact that an automatic triggering will soon be carried out if the unblock code is not updated.

In addition, a checking unit can be provided in the vehicle, which checking unit, independently of the "safety controller unit", checks whether the safety configuration by the safety controller unit was successful. This can be carried out for example by eavesdropping on the bus whether function/control units are deactivated, transmission of test messages and the like.

In this case, the checking unit can be implemented in a particularly safeguarded/certified/protected manner.

Furthermore, the checking unit can give the backend feedback concerning whether the safety configuration was implemented successfully.

Furthermore, mutual checking of the "safety controller unit" and the "additional checking unit" can be carried out, for example by means of alive, behavior checking, signature/CRC/fingerprint/certificate. Emergency measures can be provided here if the mutual checking fails, such as, for example, a notification of the backend, a deactivation or activation of safety measures, such as, for example, implementing maximum safety settings.

Furthermore, a cyclic check of the signatures and message behavior and error messages of the control units and functions can be carried out by the additional checking unit. Here, too, emergency measures can take effect if the checking fails. Qualified bulkheads can be provided here in the sense of certification for safety ISO26262 and/or security.

Both from the viewpoint of individual functions, such as, for example, remote software update function of the vehicle, HAF function, error detection of a function of a control unit, and by means of the safety controller unit and the additional checking unit, and also from the back-end side, variants concerning the refinement and activation of configurations can be envisaged and/or provided.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
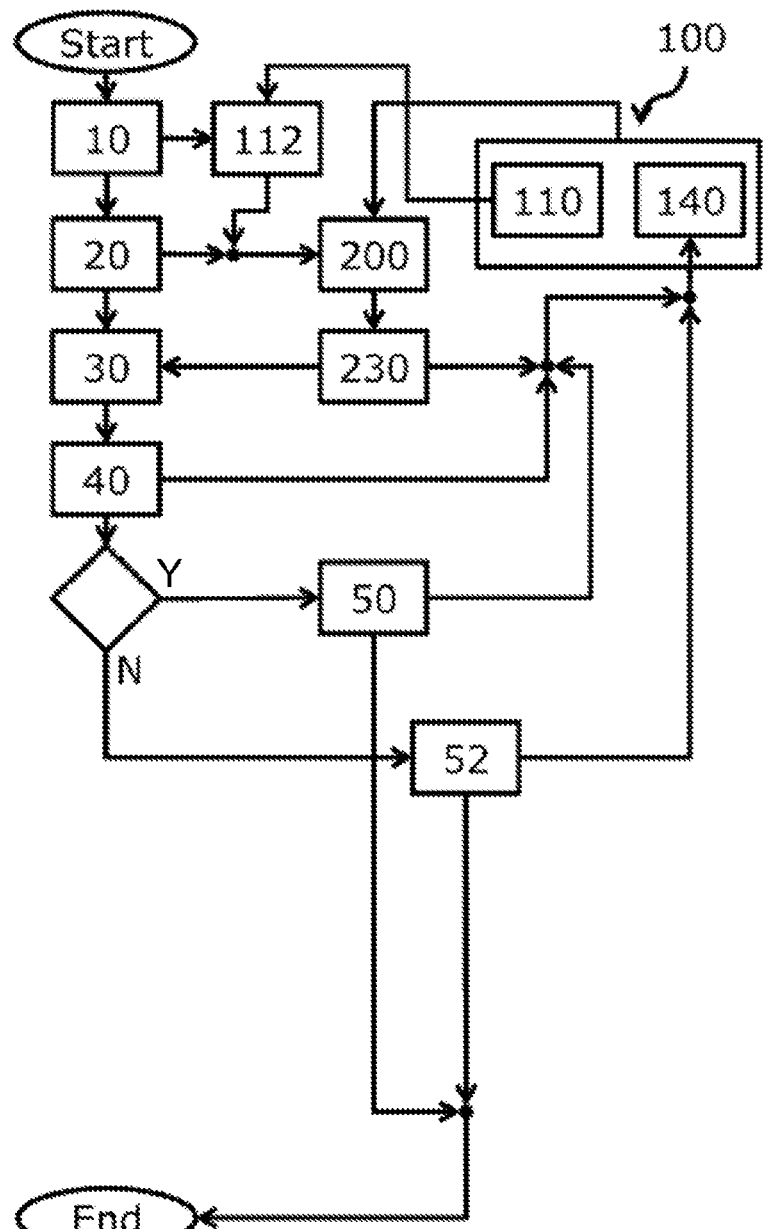
FIG. 1 shows a schematic illustration of a proposed method in accordance with one exemplary configuration of the invention.

FIG. 1 shows a schematic illustration of a proposed method in accordance with one exemplary configuration of the invention.

In this case, FIG. 1 shows a schematic illustration of a method for monitoring and modifying motor vehicle functions in a motor vehicle 100. In this case, the method comprises: determining 10 an anomalous behavior 112 of a function 110 of the motor vehicle 100. Communicating 20 the anomalous behavior 112 of the function 110 of the motor vehicle 100 to a backend 200. Receiving 30 an instruction 230 from the backend 200, wherein the instruction 230 is indicative of an acute measure to be taken in the motor vehicle 100 in order to carry out an adequate reaction to the anomalous behavior 112 of the function 110. Determining 40 a motor vehicle component 140 which is the cause of the anomalous behavior 112 of the function 110 of the motor vehicle 100, on the basis of the received instruction 230. Converting 50 the motor vehicle component 140 into a degraded configuration as adequate reaction, wherein the degraded configuration has a more limited functional scope than in the previous configuration thereof. And if converting 50 the motor vehicle component 140 into the degraded configuration is not possible, the method furthermore comprises converting 52 the motor vehicle component 140 into a safe configuration as adequate reaction, wherein the safe configuration is kept available in the motor vehicle component 140.

Figure 2:
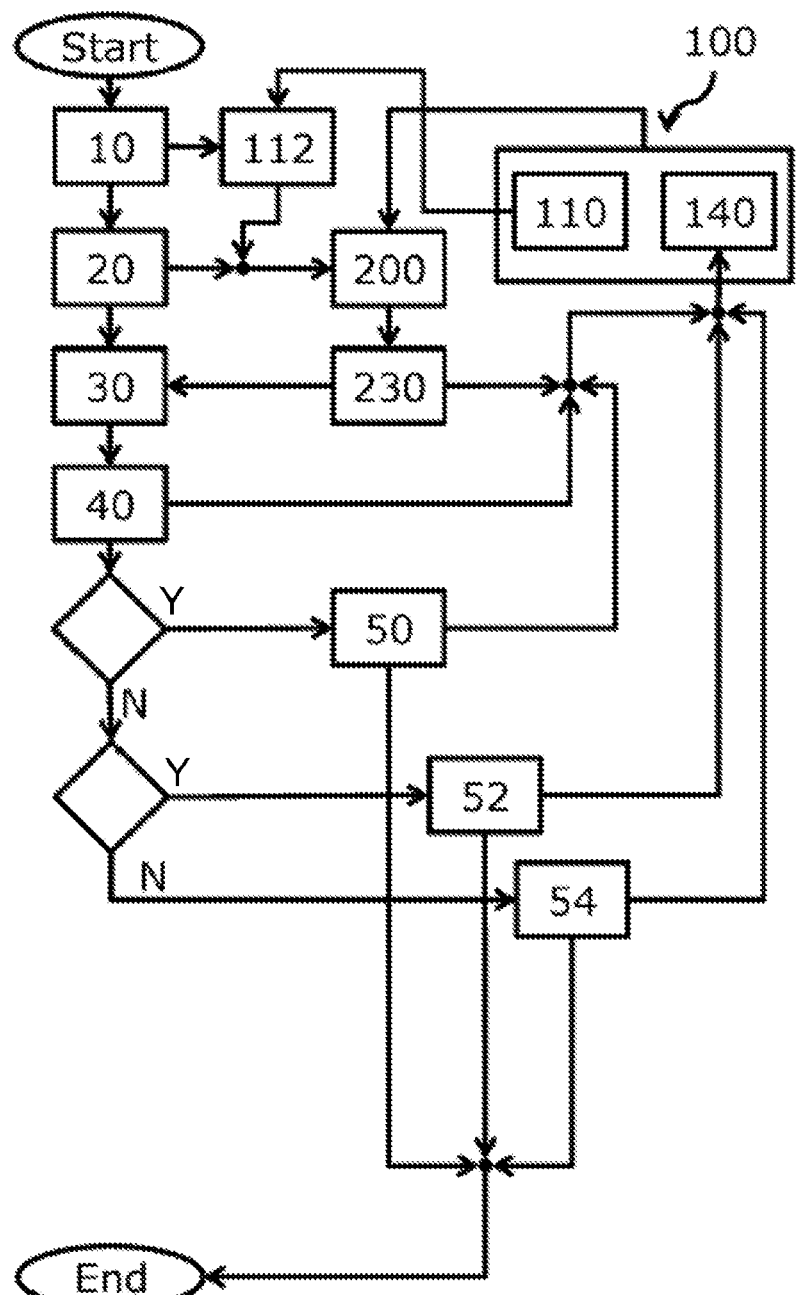
FIG. 2 shows a schematic illustration of a proposed method in accordance with a further exemplary configuration of the invention.

FIG. 2 shows a schematic illustration of a proposed method in accordance with a further exemplary configuration of the invention.

In this case, FIG. 2 shows a schematic illustration of a method that has been developed further with respect to FIG. 1. The statements made above in respect of FIG. 1 are therefore applicable to FIG. 2 as well.

FIG. 2 shows the method from FIG. 1 wherein the method furthermore comprises, for the case where converting 52 the motor vehicle component 140 into the safe configuration is not possible, switching off 54 the motor vehicle component 140 as adequate reaction.

Figure 3:
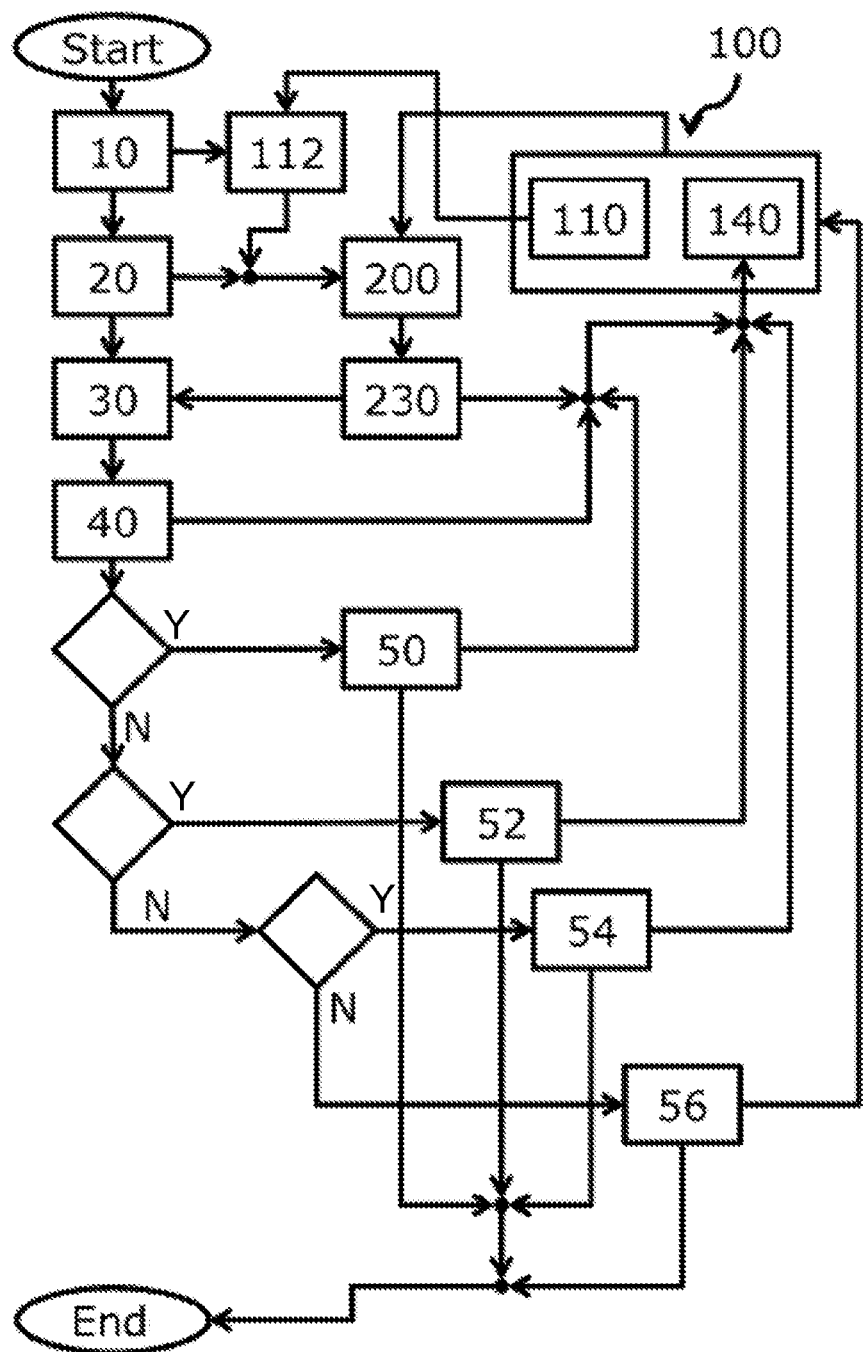
FIG. 3 shows a schematic illustration of a proposed method in accordance with a further exemplary configuration of the invention.

FIG. 3 shows a schematic illustration of a proposed method in accordance with a further exemplary configuration of the invention.

In this case, FIG. 3 shows a schematic illustration of a method that has been developed further with respect to FIG. 1 and FIG. 2. The statements made above in respect of FIGS. 1 and 2 are therefore applicable to FIG. 3 as well.

FIG. 3 shows the method from FIG. 2 wherein the method furthermore comprises, for the case where switching off 54 the motor vehicle component 140 is not successful converting 56 the motor vehicle 100 into a safe state as adequate reaction, wherein the safe state comprises safe operation of the motor vehicle 100 in respect of a safety and/or security relevance.

Figure 4:
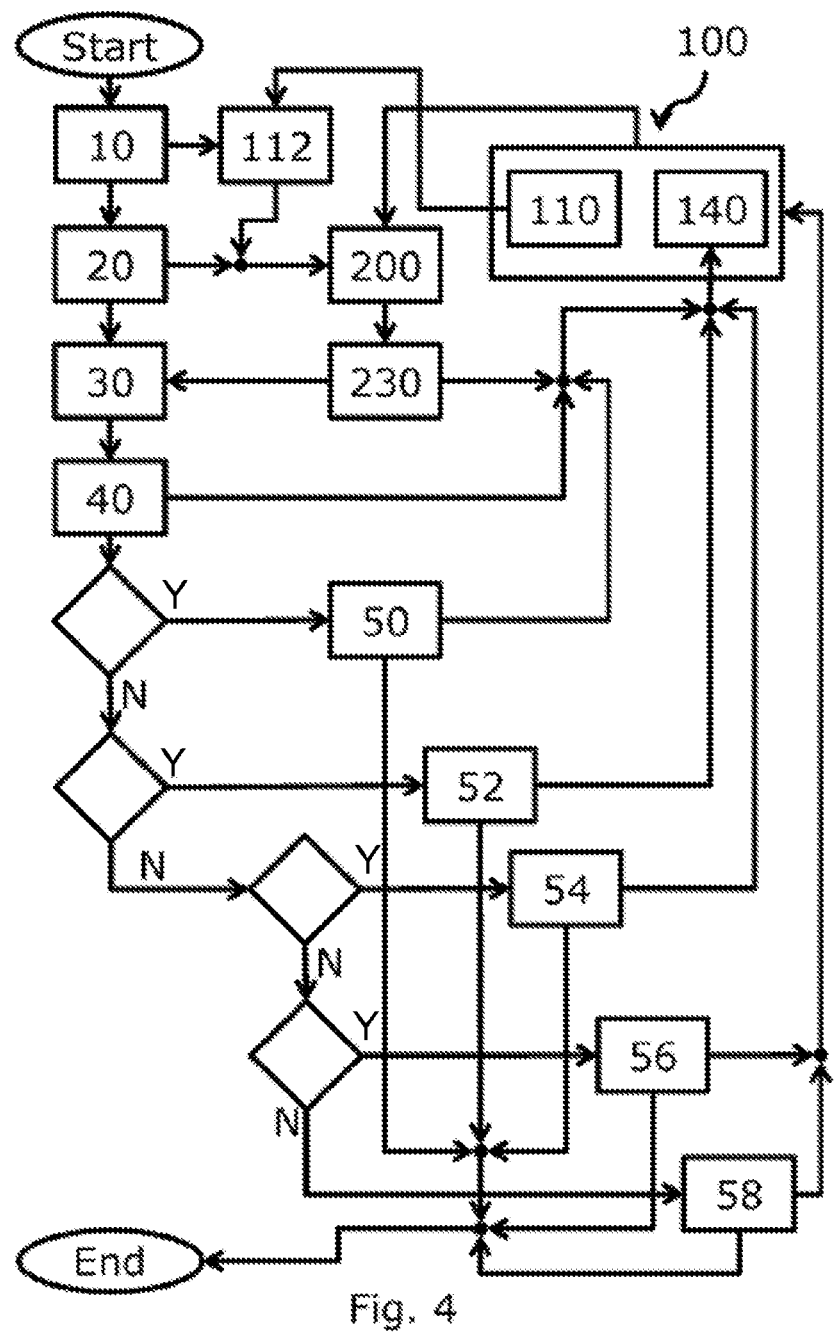
FIG. 4 shows a schematic illustration of a proposed method in accordance with a further exemplary configuration of the invention.

FIG. 4 shows a schematic illustration of a proposed method in accordance with a further exemplary configuration of the invention.

In this case, FIG. 4 shows a schematic illustration of a method that has been developed further with respect to FIG. 1 to FIG. 3. The statements made above in respect of FIG. 1 to FIG. 3 are therefore applicable to FIG. 4 as well.

FIG. 4 shows the method from FIG. 3 wherein the method furthermore comprises, for the case where converting 56 the motor vehicle 100 into the safe state is not possible switching off 58 driving operation of the motor vehicle as adequate reaction.

Figure 5:
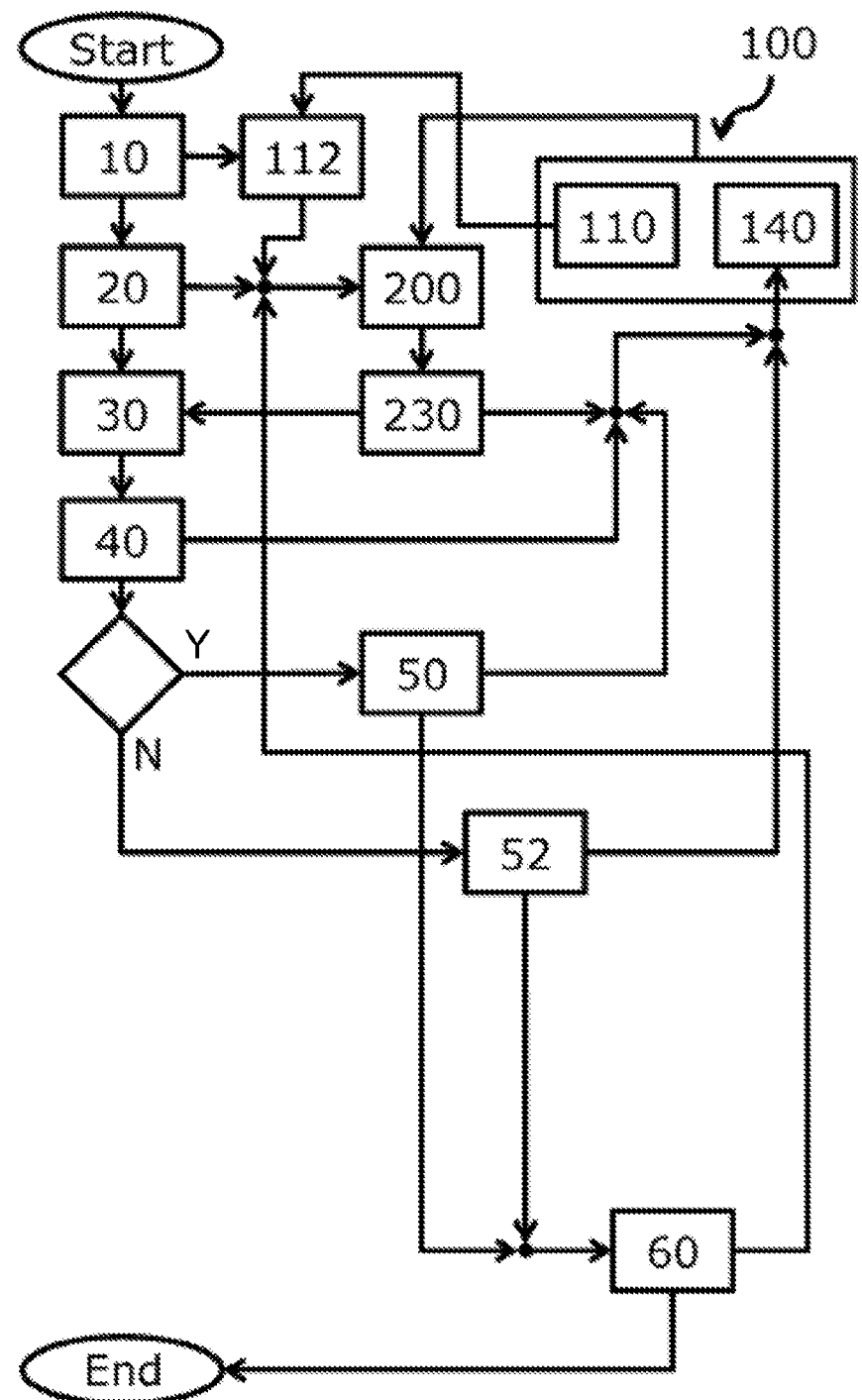
FIG. 5 shows a schematic illustration of a proposed method in accordance with a further exemplary configuration of the invention.

FIG. 5 shows a schematic illustration of a proposed method in accordance with a further exemplary configuration of the invention.

In this case, FIG. 5 shows a schematic illustration of a method that has been developed further with respect to FIG. 1 to FIG. 4. The statements made above in respect of FIG. 1 to FIG. 4 are therefore applicable to FIG. 5 as well.

FIG. 5 shows the method from FIG. 4 wherein the method furthermore comprises communicating 60 the adequate reaction carried out to the backend 200, as successfully taken acute measure in the motor vehicle 100.

Figure 6:
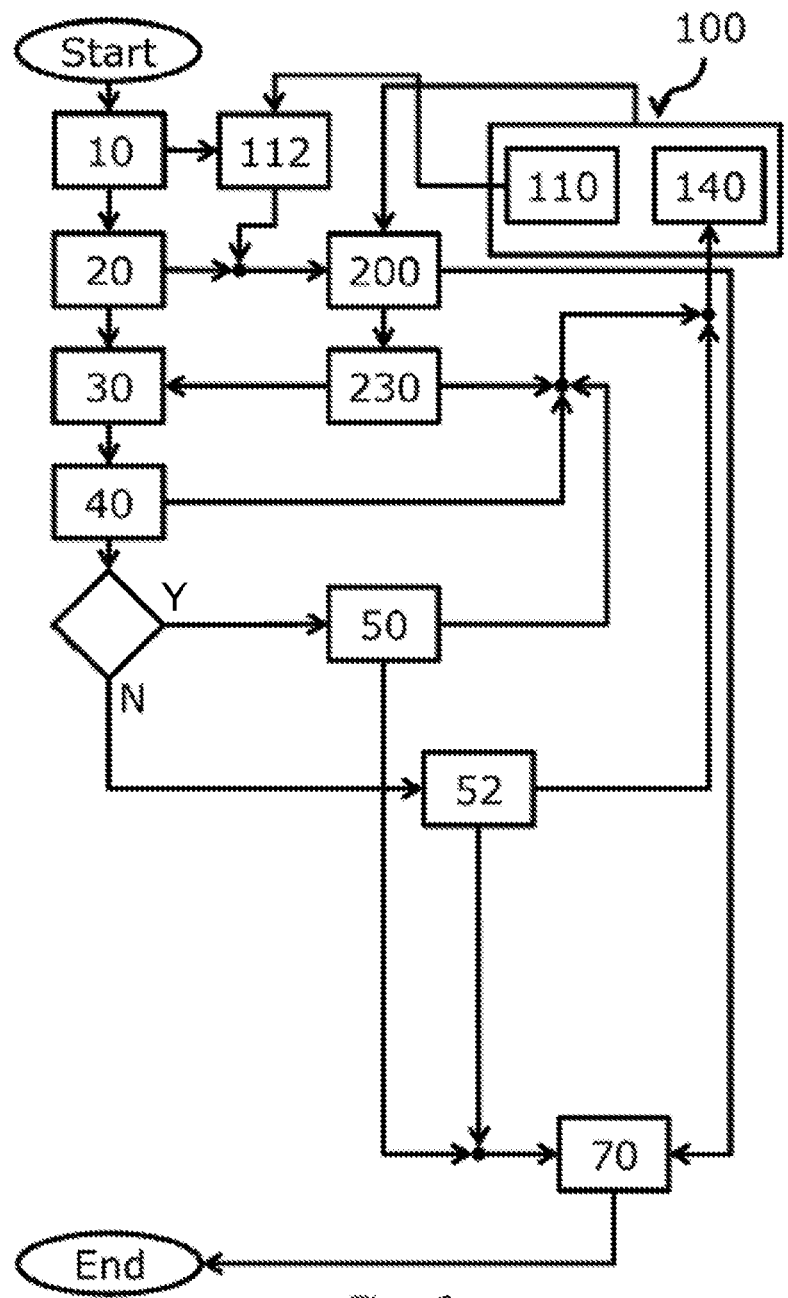
FIG. 6 shows a schematic illustration of a proposed method in accordance with a further exemplary configuration of the invention.

FIG. 6 shows a schematic illustration of a proposed method in accordance with a further exemplary configuration of the invention.

In this case, FIG. 6 shows a schematic illustration of a method that has been developed further with respect to FIG. 1. The statements made above in respect of FIG. 1 are therefore applicable to FIG. 6 as well.

FIG. 6 shows the method from FIG. 1 wherein the method furthermore comprises receiving 70 a patch from the backend 200, as an anomaly correction instruction which is indicative of a persistent measure to be taken in the motor vehicle 100 in order to eliminate and/or to prevent the anomalous behavior 112 of the function 110 in the future.

Figure 7:
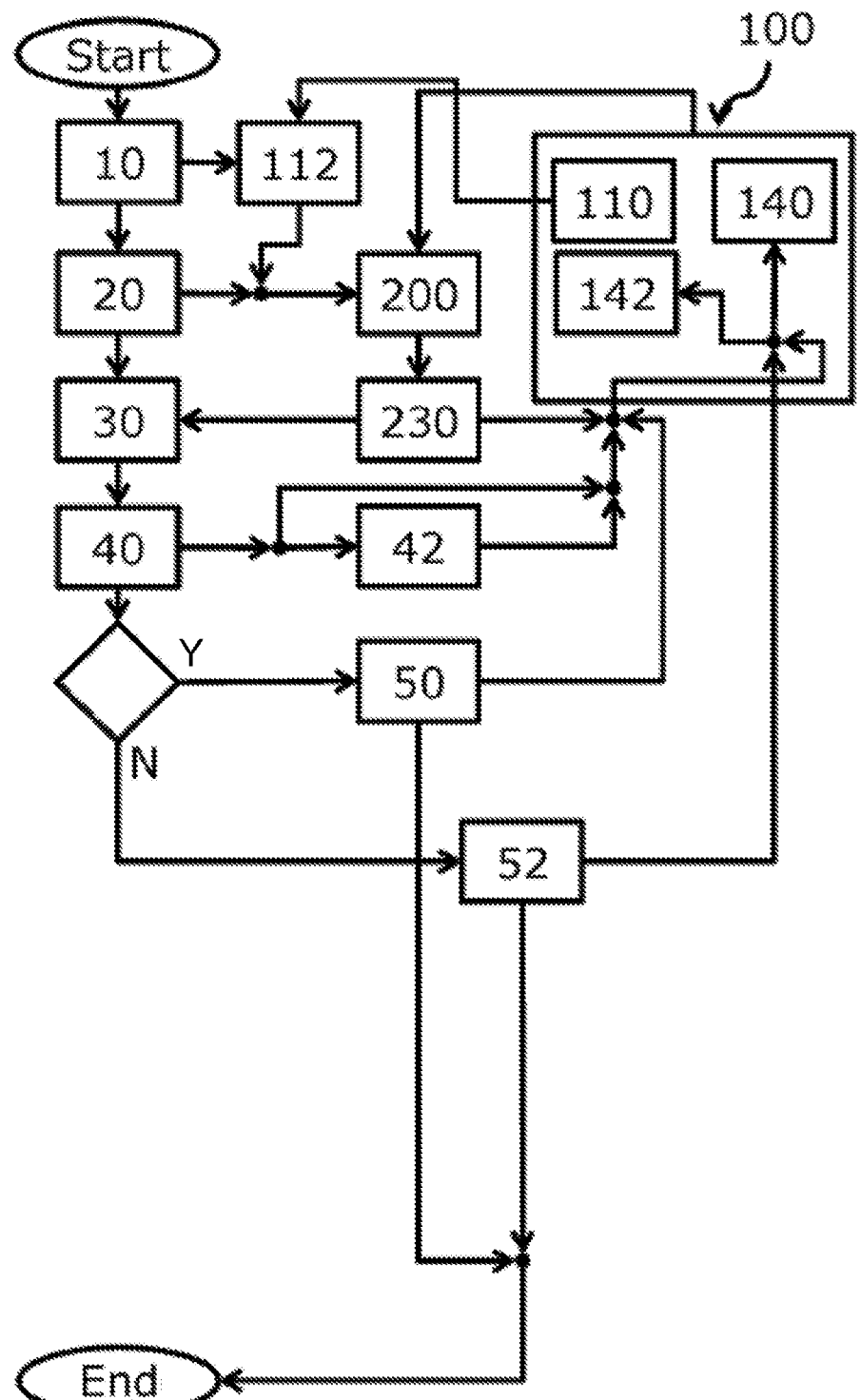
FIG. 7 shows a schematic illustration of a proposed method in accordance with a further exemplary configuration of the invention.

FIG. 7 shows a schematic illustration of a proposed method in accordance with a further exemplary configuration of the invention.

In this case, FIG. 7 shows a schematic illustration of a method that has been developed further with respect to FIG. 1. The statements made above in respect of FIG. 1 are therefore applicable to FIG. 7 as well.

FIG. 7 shows the method from FIG. 1 wherein the method furthermore comprises: determining 42 a further motor vehicle component 142 which is likewise affected by the anomalous behavior 112 of the function 110 of the motor vehicle 100, preferably on the basis of the received instruction 230. And correspondingly applying the further method steps 50, 52, 54, 56, 58, 60, 70 for modifying the motor vehicle component 140 to the further motor vehicle component 142.

Figure 8:
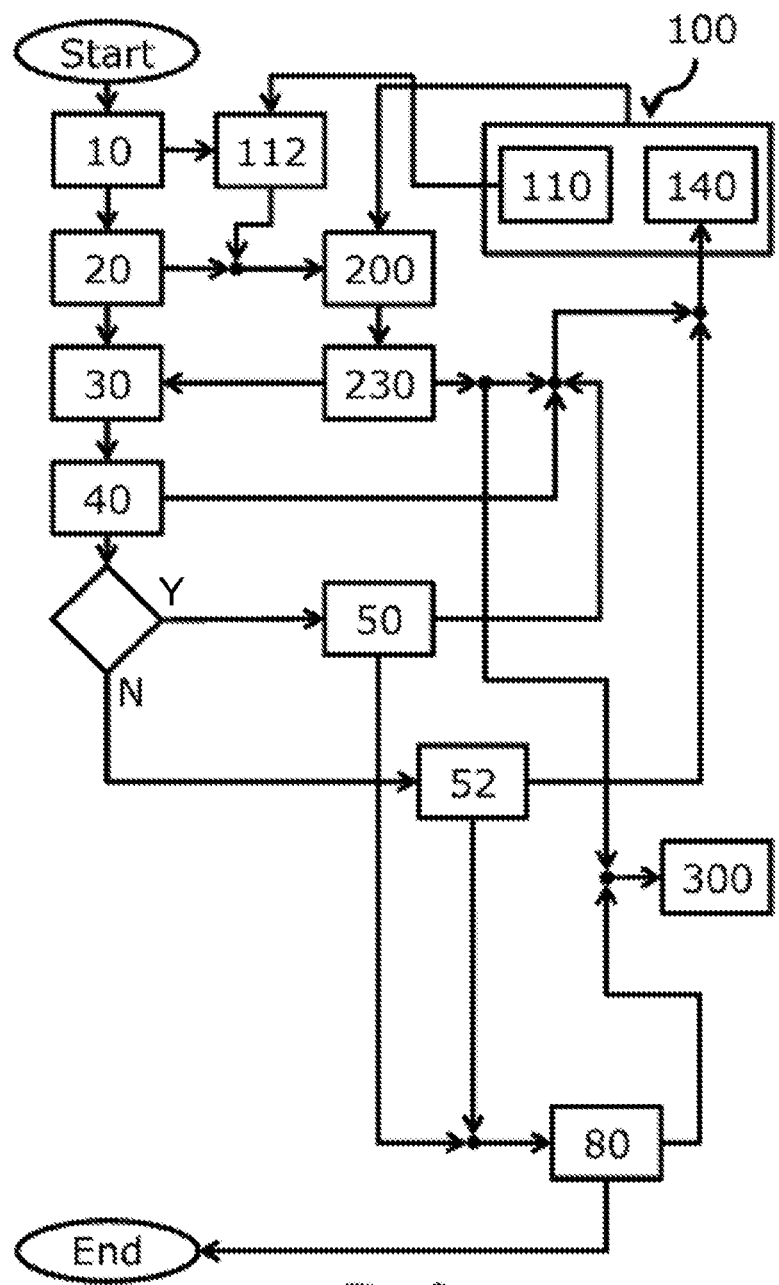
FIG. 8 shows a schematic illustration of a proposed method in accordance with a further exemplary configuration of the invention.

FIG. 8 shows a schematic illustration of a proposed method in accordance with a further exemplary configuration of the invention.

In this case, FIG. 8 shows a schematic illustration of a method that has been developed further with respect to FIG. 1. The statements made above in respect of FIG. 1 are therefore applicable to FIG. 8 as well.

FIG. 8 shows the method from FIG. 1 wherein the method furthermore comprises communicating 80 the adequate reaction carried out to a further motor vehicle 300, as instruction 230, for a current and/or preventive acute measure to be taken in the further motor vehicle 300.

Figure 9:
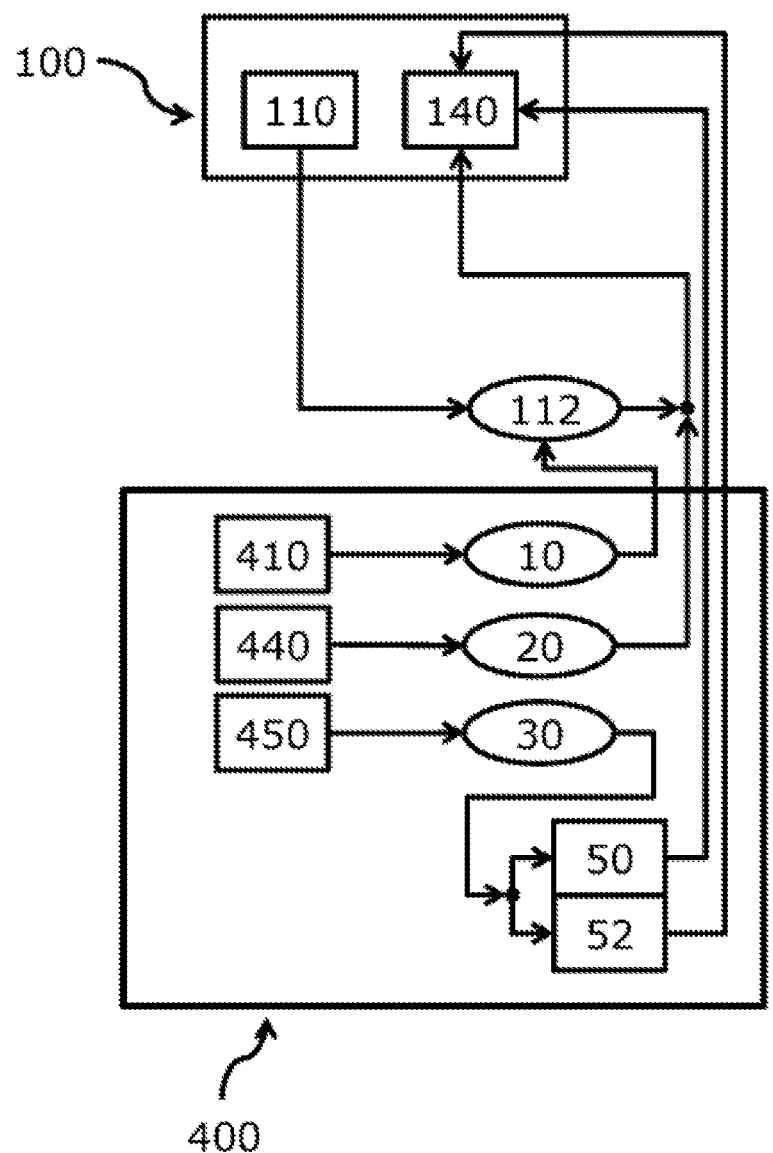
FIG. 9 shows a schematic illustration of a proposed device in accordance with a further exemplary configuration of the invention.

FIG. 9 shows a schematic illustration of a proposed device in accordance with a further exemplary configuration of the invention.

In this case, FIG. 9 shows a schematic illustration of proposed device 400 for monitoring and modifying motor vehicles functions in a motor vehicle 100. In this case, the device 400 comprises: a function monitoring device 410, for determining 10 an anomalous behavior 112 of a function 110 of the motor vehicle 100. A determining means 440, for determining 40 a motor vehicle component 140 which is the cause of the anomalous behavior 112 of the function 110 of the motor vehicle 100. A modifying means 450, for converting 50, 52 the motor vehicle component 140 into a degraded configuration and/or into a safe configuration. In this case, the degraded configuration has a more limited functional scope than in the previous configuration thereof. The safe configuration is kept available in the motor vehicle component 140. And in this case, the safe configuration of the motor vehicle component 140 is safeguarded against manipulation of the safe configuration. And in this case the device 400 is configured to carry out any method according to the invention.

Figure 10:
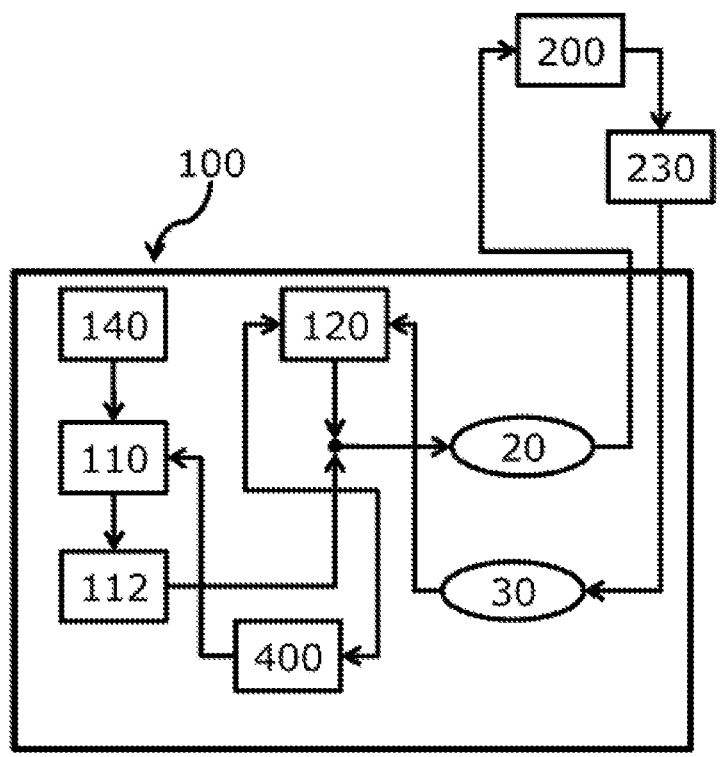
FIG. 10 shows a schematic illustration of a proposed motor vehicle in accordance with a further exemplary configuration of the invention.

FIG. 10 shows a schematic illustration of a proposed motor vehicle in accordance with one exemplary configuration of the invention.

In this case, FIG. 10 shows a schematic illustration of a motor vehicle 100 comprising: at least one motor vehicle component 140, a mobile radio communication device 120, for communicating 20 an anomalous behavior 112 of a function 110 of the motor vehicle 100 to a backend 200 and for receiving 30 an instruction 230 in respect of the anomalous behavior 112 of the function 110 and a device 400 according to the invention for monitoring and modifying motor vehicle functions in the motor vehicle 100. And in this case the motor vehicle component 140 has a safe configuration, which is preferably safeguarded against a manipulation of the safe configuration.

In this case, the device 400 according to the invention for monitoring and modifying motor vehicle functions communicates with the mobile radio communication device 120 in order to be able to carry out the corresponding monitoring of the functions 110 in the motor vehicle 100 and, as necessary, corresponding modifications in the motor vehicle 100.

The concept of the invention can be summarized as follows. A method, a device in respect thereof and a motor vehicle are provided which can make it possible that, for specific functions and/or control units in the vehicle, the parameter sets present for said functions can be altered by an interrogation to a backend and/or a server, said interrogation being initiated by the vehicle and/or the associated functions. In particular, this can also take place temporarily. This is carried out if an anomalous behavior of a function of the motor vehicle is ascertained.

In the vehicle, the parameters stored therein for functions and/or control units are in this case regarded as it were like default values of the parameter sets for the corresponding functions and/or control units. Said parameter sets can be changed as necessary by means of the proposed invention by a corresponding solution to a problem being requested and respectively communicated from a problem database, which has corresponding parameter information as a workaround of the corresponding default parameter value of the corresponding parameter of the corresponding control unit. In this case, the efficacy of the corresponding parameter and/or parameter set in respect of the solution to the problem of the critical event, that is to say the anomalous behavior, can, if appropriate, be safeguarded and/or certified in advance.

In other words, the motor vehicle or a corresponding device of the motor vehicle by itself sets up an online connection to the backend, fetches from the backend an optimum parameterization determined/calculated in the backend as parameter information and overwrites the default values with these optimum parameter values. In this case, the overwriting can be effected temporarily, in particular, such that the default values are not lost.

In this case, criteria as boundary conditions can be ascribed to the temporary values, such that upon the occurrence of such a criterion, the function is no longer parameterized with the temporary values from the backend but rather with the default values again.

Thus, upon the occurrence of an anomalous behavior, a function designed in this way and/or a control unit designed in this way, such as, for example, the driver assistance function "automatic high beam", would trigger a corresponding message as enquiry in the backend and return a suitable parameterization for the corresponding function. In this case, such a parameterization in the example of the automated high beam could pick up and correct an anomalous behavior in which, for example, a "0" was erroneously converted into a "1" and as a result illuminates oncoming vehicles in a targeted manner instead of masking them out.

List of reference signs

10  Determining an anomalous behavior of a function of the motor vehicle
20  Communicating the anomalous behavior of the function of the motor vehicle to a backend
30  Receiving an instruction from the backend
40  Determining a motor vehicle component
50  Converting the motor vehicle component into a degraded configuration
52  Converting the motor vehicle component into a safe configuration
54  Switching off the motor vehicle component
56  Converting the motor vehicle into a safe state
58  Switching off driving operation of the motor vehicle
60  Communicating the adequate reaction carried out to the backend
70  Receiving a patch from the backend
80  Communicating the adequate reaction carried out to a further motor vehicle
100  Motor vehicle
110  Function of the motor vehicle List of reference signs -continued 112  Anomalous behavior of the function of the motor vehicle
120  Mobile radio communication device
140  Motor vehicle component
142  Further motor vehicle component
200  Backend
230  Instruction
300  Further motor vehicle
400  Device
410  Function monitoring device
440  Determining unit
450  Modifying unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring and modifying motor vehicle functions in a motor vehicle, the method comprising the steps of:
   a) determining an anomalous behavior of a function of the motor vehicle;
   b) communicating the anomalous behavior of the function of the motor vehicle to a backend;
   c) receiving an instruction from the backend, wherein the instruction is indicative of an acute measure to be taken in the motor vehicle in order to carry out an adequate reaction to the anomalous behavior of the function;
   d) determining a motor vehicle component which is a cause of the anomalous behavior of the function of the motor vehicle, on the basis of the received instruction;
   e) converting the motor vehicle component into a degraded configuration as adequate reaction, wherein the degraded configuration has a more limited functional scope than in the previous configuration thereof, and if converting the motor vehicle component into the degraded configuration is not possible:
   f) then converting the motor vehicle component into a safe configuration as adequate reaction, wherein the safe configuration is kept available in the motor vehicle component.

2. The method as claimed in claim 1, wherein for a case where converting the motor vehicle component into the safe configuration is not possible:
   g) switching off the motor vehicle component as adequate reaction.

3. The method as claimed in claim 2, wherein for a case where switching off the motor vehicle component is not successful:
   h) converting the motor vehicle into a safe state as adequate reaction, wherein the safe state comprises safe operation of the motor vehicle in respect of a safety and/or security relevance.

4. The method as claimed in claim 3, wherein for a case where converting the motor vehicle into the safe state is not possible:
   i) switching off driving operation of the motor vehicle as adequate reaction.

5. The method as claimed in claim 4, wherein the
   j) switching off of the driving operation of the motor vehicle is carried out safely in respect of a safety relevance of the motor vehicle.

6. The method as claimed in claim 5, further comprising the step of:
   k) communicating the adequate reaction carried out to the backend, as a successfully taken acute measure in the motor vehicle.

7. The method as claimed in claim 6, further comprising the step of:
   l) receiving a patch from the backend, as an anomaly correction instruction which is indicative of a persistent measure to be taken in the motor vehicle in order to eliminate and/or to prevent the anomalous behavior of the function in the future.

8. The method as claimed in claim 7, further comprising the steps of:
   determining a further motor vehicle component which is likewise affected by the anomalous behavior of the function of the motor vehicle, on the basis of the received instruction, and
   correspondingly applying method steps (e)-(l) for modifying the motor vehicle component to the further motor vehicle component.

9. The method as claimed in claim 8, further comprising the step of:
   communicating the adequate reaction carried out to a further motor vehicle, as instruction, for a current and/or preventive acute measure to be taken in the further motor vehicle.

10. The method as claimed in claim 9, wherein communicating the adequate reaction carried out to the further motor vehicle is carried out from the motor vehicle.

11. The method as claimed in claim 9, wherein communicating the adequate reaction carried out to the further motor vehicle is carried out from the backend.

12. The method as claimed in claim 1, wherein determining the anomalous behavior of the function of the motor vehicle is ascertainable by:
   the backend,
   a motor vehicle occupant, and/or
   a motor vehicle-specific routine.

13. The method as claimed in claim 12, wherein the backend comprises a certified motor vehicle-external authority.

14. The method as claimed in claim 1, wherein the instruction comprises an indication of the criteria under which the adequate reaction can be canceled again.

15. The method as claimed in claim 1, wherein the anomalous behavior of the function of the motor vehicle is indicative of hacking of the motor vehicle or of the motor vehicle component.

16. The method as claimed in claim 1, wherein the anomalous behavior of the function is suitable for jeopardizing functionally safe operation of the motor vehicle.

17. The method as claimed in claim 1, wherein the safe configuration of the motor vehicle component is safeguarded against manipulation of the safe configuration.

18. A device for monitoring and modifying motor vehicle functions in a motor vehicle, the device comprising:
   a function monitoring device, for determining an anomalous behavior of a function of the motor vehicle,
   a determining unit, for determining a motor vehicle component which is the cause of the anomalous behavior of the function of the motor vehicle, and
   a modifying unit, for converting the motor vehicle component into:
      a degraded configuration, wherein the degraded configuration has a more limited functional scope than in the previous configuration thereof, and
      a safe configuration, wherein
         the safe configuration is kept available in the motor vehicle component, and
         the safe configuration of the motor vehicle component is safeguarded against manipulation of the safe configuration.

19. A motor vehicle, comprising:
   at least one motor vehicle component, wherein the motor vehicle component has a safe configuration, which is safeguarded against manipulation of the safe configuration;
   a mobile radio communication device, for communicating an anomalous behavior of a function of the motor vehicle to a backend and for receiving an instruction in respect of the anomalous behavior of the function; and
   a device for monitoring and modifying motor vehicle functions in the motor vehicle, as claimed in claim 18.

20. A computer program product comprising a non-transitory computer readable medium having stored thereon program code sections that, when executed, carry out the acts of:
   a) determining an anomalous behavior of a function of the motor vehicle;
   b) communicating the anomalous behavior of the function of the motor vehicle to a backend;
   c) receiving an instruction from the backend, wherein the instruction is indicative of an acute measure to be taken in the motor vehicle in order to carry out an adequate reaction to the anomalous behavior of the function;
   d) determining a motor vehicle component which is a cause of the anomalous behavior of the function of the motor vehicle, on the basis of the received instruction;
   e) converting the motor vehicle component into a degraded configuration as adequate reaction, wherein the degraded configuration has a more limited functional scope than in the previous configuration thereof, and if converting the motor vehicle component into the degraded configuration is not possible:
   f) then converting the motor vehicle component into a safe configuration as adequate reaction, wherein the safe configuration is kept available in the motor vehicle component.

\* \* \* \* \*